US012654822B2

(12) United States Patent
Akiike et al.

(10) Patent No.: US 12,654,822 B2
(45) Date of Patent: Jun. 16, 2026

(54) NAVIGATION ASSISTANCE DEVICE, NAVIGATION ASSISTANCE METHOD, AND PROGRAM

(71) Applicants: JAPAN RADIO CO., LTD., Tokyo (JP); National University Corporation Tokyo University of Marine Science and Technology, Tokyo (JP)

(72) Inventors: Takanori Akiike, Tokyo (JP); Jun Satsumabayashi, Tokyo (JP); Kengo Toeda, Tokyo (JP); Hayama Imazu, Tokyo (JP); Ruri Shoji, Tokyo (JP)

(73) Assignees: JAPAN RADIO CO., LTD., Tokyo (JP); NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 199 days.

(21) Appl. No.: 18/575,551

(22) PCT Filed: Jul. 14, 2022

(86) PCT No.: PCT/JP2022/027670
§ 371 (c)(1),
(2) Date: Dec. 29, 2023

(87) PCT Pub. No.: WO2023/286825
PCT Pub. Date: Jan. 19, 2023

(65) Prior Publication Data
US 2024/0317368 A1 Sep. 26, 2024

(30) Foreign Application Priority Data
Jul. 15, 2021 (JP) ................................ 2021-116984

(51) Int. Cl.
*G08G 3/02* (2006.01)
*B63B 43/18* (2006.01)
*B63B 49/00* (2006.01)

(52) U.S. Cl.
CPC .............. *B63B 43/18* (2013.01); *B63B 49/00* (2013.01); *G08G 3/02* (2013.01)

(58) Field of Classification Search
CPC ......... B63B 49/00; B63B 79/40; B63B 43/18; G01C 21/203; G08G 3/02; G01S 7/10; G01S 13/937
See application file for complete search history.

(56) References Cited

U.S. PATENT DOCUMENTS

2020/0035106 A1* 1/2020 Suzuki ..................... G08G 3/02
2020/0410869 A1* 12/2020 Hakoyama ............ G01C 21/22

FOREIGN PATENT DOCUMENTS

CA 2696432 C * 7/2017 ............... G05B 9/03
JP H07-129872 A 5/1995
(Continued)

OTHER PUBLICATIONS

Sawada, Ryohei, Keiji Sato, and Takahiro Majima. "Automatic ship collision avoidance using deep reinforcement learning with LSTM in continuous action spaces." Journal of Marine Science and Technology 26, No. 2 (2021): 509-524. (Year: 2021).*
(Continued)

*Primary Examiner* — Cuong H Nguyen
(74) *Attorney, Agent, or Firm* — Rankin, Hill & Clark LLP

(57) ABSTRACT

Provided is a navigation assistance device capable of obtaining an obstacle zone by target in consideration of an allowance. A navigation assistance device for obtaining an obstacle zone by target from a relationship between an own ship and a target ship includes a margin acquisition unit that
(Continued)

acquires a margin indicating the degree of allowance, and an arithmetic unit that obtains a margin position which is a position separated from at least any of the bow or stern of the target ship in a target occupied space set with reference to the position of the target ship by a distance determined according to the margin, obtains a collision course based on a position determined according to the motion vector of the target ship with reference to the margin position, and calculates the obstacle zone by target based on the obtained collision course.

10 Claims, 10 Drawing Sheets

(56) References Cited

FOREIGN PATENT DOCUMENTS

| | | | | | |
|---|---|---|---|---|---|
| JP | 2013028296 | A | * | 2/2013 | ............... G08G 3/02 |
| JP | 2019-166865 | A | | 10/2019 | |
| JP | 2020-095333 | A | | 6/2020 | |
| JP | 2021-018484 | A | | 2/2021 | |
| JP | 2021-187422 | A | | 12/2021 | |
| JP | 7107550 | B2 | * | 7/2022 | ............... G08G 3/02 |
| JP | 2022170015 | A | * | 11/2022 | ............... G08G 3/02 |
| JP | 7636957 | B2 | * | 2/2025 | ............... G08G 3/02 |
| KR | 20220128424 | A | * | 9/2022 | ............. B63B 79/40 |
| WO | 2018/193596 | A1 | | 10/2018 | |

OTHER PUBLICATIONS

Kuwahara, S., Nishimura, H., Nakagawa, K., Yoshinaga, M., Iseki, S., Yoshida, R., Hakoyama, T., Kutsuna, K. and Nakamura, J., 2021. Research and development of collision risk decision method for safe navigation and its verification. ClassNK technical journal , 3(1), pp. 13-40. (Year: 2021).*

Fukuto, Junji, and Hayama Imazu. "New collision alarm algorithm using obstacle zone by target (OZT)." IFAC proceedings vols. 46.33 (2013): 91-96. (Year: 2013).*

Giakoumakis, Konstantinos. "Development of a negative selection algorithm for ship collision risk detection." (2023). (Year: 2023).*

周靖恩, and シュウセイオン. OZTを用いた船舶航行解析に関する研究. "A study on analysis of ships navigation using OZT" Diss. Tokyo University of Marine Science Technology, 2017. (Year: 2017).*

International Search Report mailed on Oct. 4, 2022 for PCT/JP2022/027670.

Extended European search report issued on Jun. 3, 2025, for the corresponding European Patent Application No. 22842167.3.

Ryohei Sawada et al., "Automatic ship collision avoidance using deep reinforcement learning with LSTM in continuous action spaces", Journal of Marine Science and Technology, Aug. 2020 (Aug. 3, 2020), vol. 26, No. 2, 3, pp. 509-524, XP037468595, Tokyo, JP.

Satoru Kuwahara et al., "Research and Development of Collision Risk Decision Method for Safe Navigation and Its Verification", ClassNK Technical Journal, Jan. 1, 2021 (Jan. 1, 2021), No. 3, XP093273612.

* cited by examiner

NAVIGATION ASSISTANCE DEVICE, NAVIGATION ASSISTANCE METHOD, AND PROGRAM

TECHNICAL FIELD

The present invention relates to a navigation assistance device, a navigation assistance method, and a program.

BACKGROUND ART

In recent years, as a system that supports navigation, there has been a system that displays the risk of collision between an own ship and a target ship in a recognizable manner. For example, there has been a system that performs collision calculation for an own ship and a target ship and displays an obstacle zone by target (OZT) based on a collision calculation result (e.g., Patent Literature 1).

In such a system, when the obstacle zone by target is displayed, a navigator can specifically grasp an area to be noted. In addition, if the navigator steers the ship while avoiding the displayed obstacle zone by target, the navigator can navigate the ship without collision with other ships.

CITATION LIST

Patent Literature

Patent Literature 1: JP-A-2020-095333

SUMMARY OF INVENTION

Problems to be Solved by Invention

However, in a case where the own ship passes by the target ship, if the own ship passes by the vicinity of the obstacle zone by target, the own ship approaches the target ship. When the own ship approaches the target ship, the risk of collision increases, and there is a possibility that a navigator of the target ship becomes anxious. For this reason, it is preferable that the own ship can pass by the obstacle zone by target with a certain allowance.

The present invention has been made in view of such circumstances, and an object thereof is to provide a navigation assistance device, a navigation assistance method, and a program capable of obtaining an obstacle zone by target in consideration of an allowance.

Solution to Problems

In order to solve the above-described problems, one aspect of the present invention is a navigation assistance device for obtaining an obstacle zone by target from a relationship between an own ship and a target ship, the navigation assistance device including a margin acquisition unit that acquires a margin indicating the degree of allowance, and an arithmetic unit that obtains a margin position which is a position separated from at least any of the bow or stern of the target ship in a target occupied space set with reference to the position of the target ship by a distance determined according to the margin, obtains a collision course based on a position determined according to the motion vector of the target ship with reference to the margin position, and calculates the obstacle zone by target based on the obtained collision course.

Further, one aspect of the present invention is a navigation assistance method executed by a computer for obtaining an obstacle zone by target from a relationship between an own ship and a target ship, the navigation assistance method including a margin acquisition unit acquiring a margin indicating the degree of allowance, and an arithmetic unit obtaining a margin position which is a position separated from at least any of the bow or stern of the target ship in a target occupied space set with reference to the position of the target ship by a distance determined according to the margin, obtaining a collision course based on a position determined according to the motion vector of the target ship with reference to the margin position, and calculating the obstacle zone by target based on the obtained collision course.

Moreover, one aspect of the present invention is a program causing a computer to acquire a margin indicating the degree of allowance, and obtain a margin position which is a position separated from at least any of the bow or stern of a target ship in a target occupied space set with reference to the position of the target ship by a distance determined according to the margin, obtain a collision course based on a position determined according to the motion vector of the target ship with reference to the margin position, and calculate an obstacle zone by target based on the obtained collision course.

Effects of Invention

As described above, according to the present invention, it is possible to obtain the obstacle zone by target in consideration of the allowance.

DESCRIPTION OF EMBODIMENTS

Hereinafter, a navigation assistance device according to one embodiment of the present invention will be described with reference to the drawings.

Figure 1:
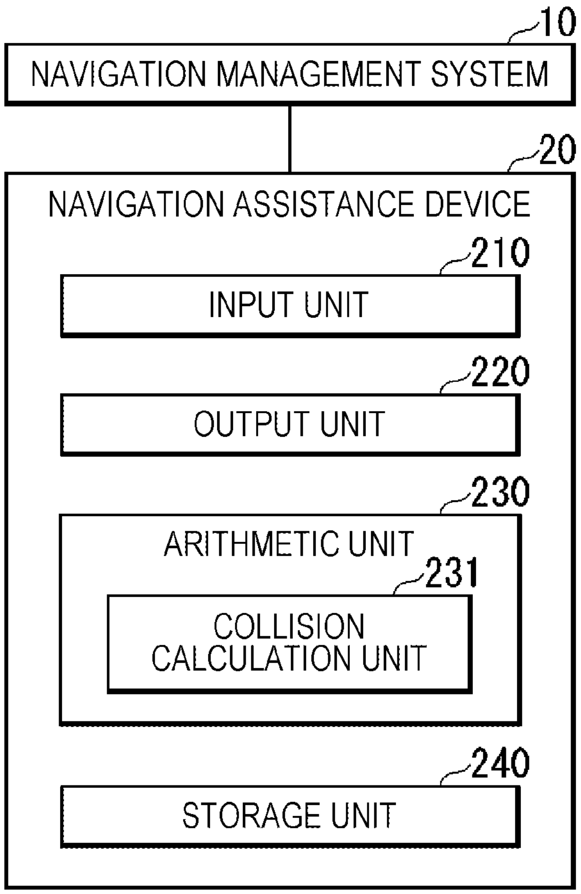
FIG. 1 is a schematic block diagram illustrating the configuration of a system using a navigation assistance device.

FIG. 1 is a schematic block diagram illustrating the configuration of a system using the navigation assistance device according to one embodiment of the present invention.

A navigation management system 10 and a navigation assistance device 20 are communicably connected to each other.

The navigation management system 10 is a sensor such as a radar (target tracking; TT), an automatic identification system (AIS), a gyro, or speed and distance measurement equipment. The navigation management system 10 supplies results obtained from various sensors to the navigation assistance device 20. The navigation management system 10 includes, for example, an electronic chart display and information system (ECDIS) and a ship radar device.

The navigation assistance device 20 may be a computer or may be built in the radar or the ECDIS as a module, or the output of the navigation assistance device 20 may be displayed on the radar or the ECDIS.

In addition, the function of the navigation assistance device 20 may be implemented by being installed and executed in a portable terminal device, such as a smartphone or a tablet, as application software for implementing the function of the navigation assistance device 20. Such a navigation assistance device 20 is mounted on a ship.

The navigation assistance device 20 has a function of displaying an obstacle zone by target (OZT) by performing collision calculation based on a relationship between an own ship and a target ship.

The collision calculation is performed based on various types of information (position, speed, traveling direction, and the like) on the own ship and the target ship and a safe passing distance. In this embodiment, in addition to these types of data, the collision calculation is performed in consideration of a passing distance desired in the bow direction or stern direction of the target ship. In this manner, the obstacle zone by target is obtained.

The navigation assistance device 20 includes an input unit 210, an output unit 220, an arithmetic unit 230, and a storage unit 240.

The input unit 210 acquires various types of data. For example, the input unit 210 acquires, from the navigation management system 10, results obtained from various sensors in the navigation management system 10.

In addition, the input unit 210 acquires a margin indicating the degree of allowance. This margin indicates the degree of allowance to be considered in the collision calculation when an obstacle zone by target different from an obstacle zone by target based on a result of general collision calculation is obtained in order to display the obstacle zone by target. More specifically, in a case where the own ship passes by the target ship, if the own ship passes by the vicinity of the obstacle zone by target, the own ship approaches the target ship. However, the obstacle zone by target is obtained with a certain passing distance as an allowance in the bow direction or stern direction of the target ship. The margin can indicate the passing distance set as the allowance by a degree. The degree may be a level, a ratio, or the passing distance itself. In a case where the level is used, the passing distance can be determined according to the level. In a case where the ratio is used, the level may indicate the percentage of the allowance with respect to the size of an occupied space of the target ship.

When acquiring the margin, the input unit 210 acquires the margin corresponding to the contents of operation on an operator provided in the navigation assistance device 20. The operator may be, for example, any of a dial, a numeric keypad, or a touch panel. An arbitrary margin can be set by operating the operator as necessary by a navigator or a crew. In addition, the input via the operator may be operation input for specifying a desired passing distance instead of the margin.

In addition, the input unit 210 can also acquire a margin (or desired passing distance) according to the angle of the target ship with respect to the own ship, which is determined based on the position of the own ship and the position of the target ship. This angle can be obtained based on the positions of the own ship and the target ship, which are obtained from the navigation management system 10. When acquiring data indicating the positions of the own ship and the target ship, the input unit 210 obtains the angle of the target ship with respect to the own ship and obtains the margin corresponding to the angle, thereby acquiring the margin. For example, as compared to a case where the angle of the target ship with respect to the own ship is small (case where the target ship sails to the own ship side from the front side of the course of the own ship), the margin is greater in a case where the angle of the target ship with respect to the own ship is great (case where the target ship sails to the own ship side, e.g., laterally to the course of the own ship). That is, the margin may be changed according to the angle with which the target ship sails to the own ship. In this case, the margin can be automatically set according to the positions of the own ship and the target ship without the navigator or the crew operating the operator.

In addition, the input unit 210 may acquire a margin corresponding to the type of target ship, which is obtained from the navigation management system 10, based on such a ship type. For example, in a case where the navigation management system 10 includes the automatic identification system (AIS), the input unit 210 may acquire ship type information indicating the type of target ship from the AIS, and may acquire the margin for each target ship according to the type of target ship. In a case where the type of target ship is a small fishing boat or a pleasure boat, the target ship can make a small turn and the target ship itself can easily take an avoidance action, the margin is set small for such a target ship. On the other hand, in a case where the type of target ship is a type which is difficult to take an avoidance action, such as a container ship, the margin is set great for such a target ship. With this configuration, it is possible to set the margin in consideration of ease of the avoidance action by the target ship based on the type of target ship.

The input unit 210 acquires the changed margin in response to the change in the margin. For example, the margin can be acquired again in every lapse of predetermined certain time (e.g., 1 second).

Such an input unit 210 has a function as a margin acquisition unit.

The output unit 220 outputs data to a display device. For example, in a case where the display device is provided in the navigation assistance device 20, the output unit 220 outputs data to the display device such that various types of data are displayed on the display device. In addition, the output unit 220 may output data to the electronic chart display and information system or the ship radar device such that the data is displayed on the electronic chart display and information system or the ship radar device.

For example, the output unit 220 may display the obstacle zone by target obtained by the arithmetic unit 230 with superimposed on a display area where a radar screen is displayed, or may display the obstacle zone by target in a display area adjacent to the radar screen. In addition, the output unit 220 may switch the obstacle zone by target to any of a non-display state or a display state according to an instruction input via the operator.

The arithmetic unit 230 performs various types of arithmetic processing based on the data obtained from the input unit 210, and outputs an arithmetic processing result via the output unit 220 to display various types of data on the display device.

The arithmetic unit 230 may include, for example, a processing device such as a central processing unit (CPU) or a dedicated electronic circuit.

The arithmetic unit 230 has a function as a collision calculation unit 231.

The collision calculation unit 231 performs the collision calculation for determining whether or not the own ship and the target ship collide with each other based on various types of data obtained from the navigation management system 10, and determines the obstacle zone by target (OZT). There are several methods for obtaining the OZT in the collision calculation, but in the present embodiment, a case of calculating the OZT based on a method called "line segment OZT" will be described.

The collision calculation unit 231 performs the collision calculation based on the margin input from the input unit 210. In the collision calculation based on the margin, the collision calculation unit 231 has a function as a margin position calculation unit that obtains a margin position which is a position separated from at least any of the bow or stern position of the target ship in a target occupied space by a distance (passing distance) determined according to the margin. The target occupied space is a space set based on the safe passing distance with reference to the position of the target ship. The target occupied space may be a target ship area (e.g., circle Sb described later) set with reference to the position of the target ship, or may be an area including the target ship area and an adjacent area (e.g., circle Sa and circle Sc described later) set according to the target ship area at a position adjacent to the target ship area on at least one of the bow or stern side of the target ship area.

That is, a target occupied space E1 may include not only one small circle, but also two or three small circles. In addition, two or more adjacent areas may be set on the bow side of the target ship, or two or more adjacent areas may be set on the stern side of the target ship. These numbers may be determined, for example, in accordance with the shape of a hull. In addition, the size of each circle may be changed according to the shape of the hull. In this manner, the target occupied space E1 may be changed according to a purpose or use application.

When the margin position is obtained, the collision calculation unit 231 obtains a collision course based on a position determined according to the motion vector of the target ship with reference to the margin position, and calculates the obstacle zone by target based on the obtained collision course.

When the changed margin is obtained from the input unit 210 in response to the change in the margin, the collision calculation unit 231 obtains a margin position corresponding to the changed margin, and performs the collision calculation.

In this manner, the collision calculation unit 231 performs the collision calculation in response to the change in the margin, and displays the obstacle zone by target.

The storage unit 240 stores various types of data. The storage unit 240 may store a computer program for implementing a function of acquiring the margin in the input unit 210 and the function of the collision calculation unit 231, and the arithmetic unit 230 may read and execute the computer program to implement the function of acquiring the margin in the input unit 210 and the function of the collision calculation unit 231.

The storage unit 240 includes, for example, a storage medium such as a hard disk drive (HDD), a flash memory, an electrically erasable programmable read only memory (EEPROM), a random access read/write memory (RAM), or a read only memory (ROM) or an arbitrary combination of these storage media.

As the storage unit 240, for example, a nonvolatile memory can be used.

Figure 2:
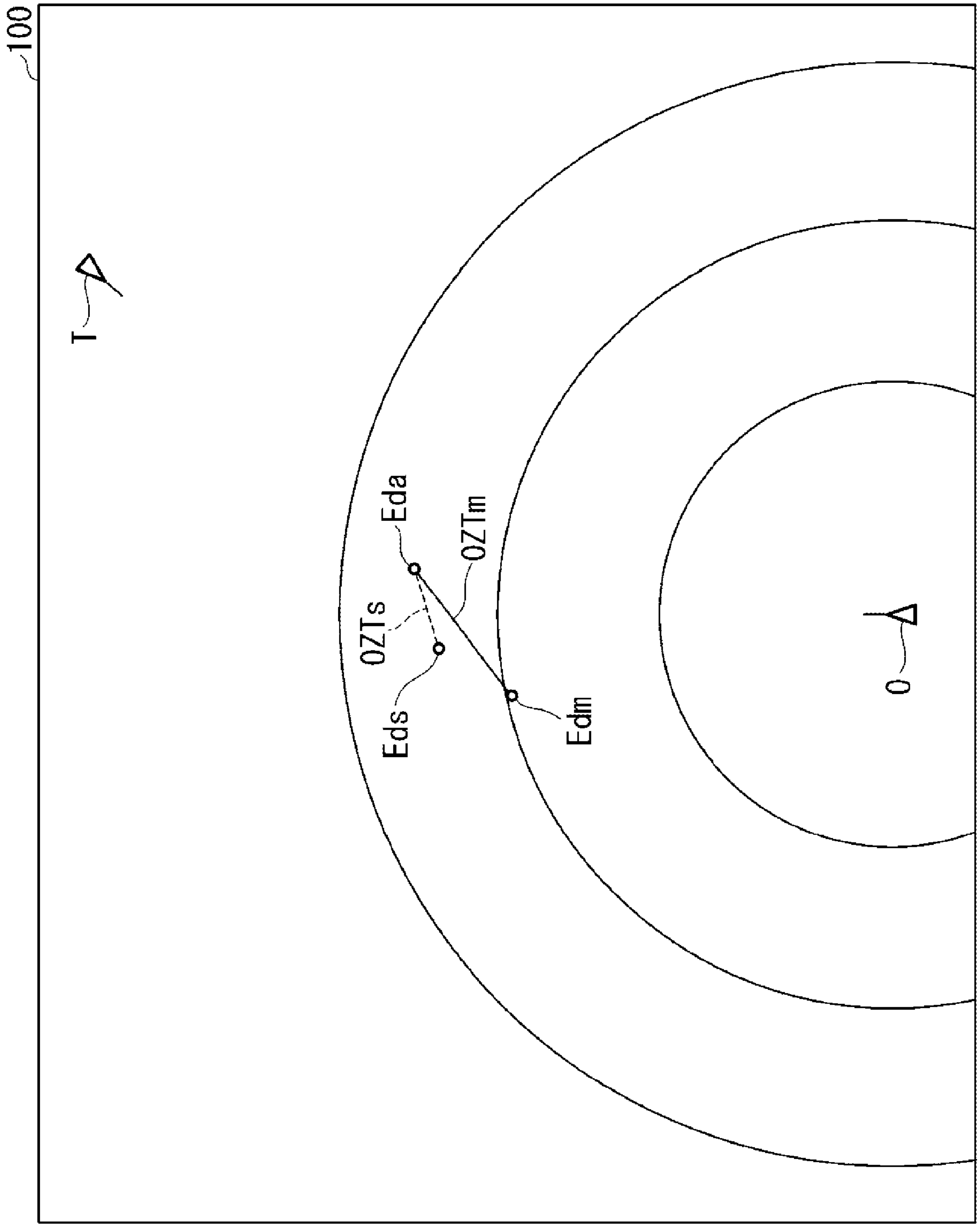
FIG. 2 is a view illustrating one example of a display screen 100 on which an obstacle zone by target is displayed.

FIG. 2 is a view illustrating one example of a display screen 100 on which the obstacle zone by target is displayed on the display device based on the data output from the output unit 220.

On the display screen 100, an own ship O, a target ship T, and an obstacle zone by target OZTs and an obstacle zone by target OZTm for the target ship are displayed. Further, a scale in the form of concentric circles about the own ship O is also displayed.

The obstacle zone by target OZTs and the obstacle zone by target OZTm indicate areas where there is a risk of collision between the own ship O and the target ship T.

The obstacle zone by target OZTs is an obstacle zone by target obtained by performing the collision calculation based on a general arithmetic processing method, and the obstacle zone by target OZTm is an obstacle zone by target obtained by performing the collision calculation in consideration of the margin as described in the present embodiment.

Although details will be described later, the obstacle zone by target OZTm is an obstacle zone by target in a case where the calculation is performed with a desired passing distance on the bow side of the target ship.

In a case where the course of the own ship O is included in the area indicated by any of the obstacle zone by target OZTs and the obstacle zone by target OZTm, it indicates that the target ship will enter the safe passing distance with reference to the own ship in the future. The safe passing distance is a distance determined according to a distance with which the own ship can safely pass by the target ship with the shortest distance to the target ship.

In comparison between the obstacle zone by target OZTs and the obstacle zone by target OZTm, one end (reference numeral Eda) of each of the obstacle zone by target OZTs and the obstacle zone by target OZTm is at the same position, but the other end (reference numeral Eds) of the obstacle zone by target OZTs and the other end (reference numeral Edm) of the obstacle zone by target OZTm are at different positions.

Here, one end (reference numeral Eda) of each of the obstacle zone by target OZTs and the obstacle zone by target OZTm indicates an end portion of the obstacle zone by target on the stern side of the target ship, and the other end (reference numeral Eds) of the obstacle zone by target OZTs and the other end (reference numeral Edm) of the obstacle zone by target OZTm indicate an end portion of the obstacle zone by target on the bow side of the target ship. In this example, since the desired passing distance is provided on the bow side of the target ship, one end (reference numeral Eda) of each of the obstacle zone by target OZTs and the obstacle zone by target OZTm is at the same position, but the other end (reference numeral Eds) of the obstacle zone by target OZTs and the other end (reference numeral Edm) of the obstacle zone by target OZTm are obtained at different positions.

The other end (reference numeral Edm) of the obstacle zone by target OZTm is arranged closer to the own ship than the other end (reference numeral Eds) of the obstacle zone by target OZTs is to the own ship. Further, in comparison between the lengths of the line segments of the obstacle zone by target OZTs and the obstacle zone by target OZTm, the obstacle zone by target OZTm is longer than the obstacle zone by target OZTs.

As described above, in the present embodiment, by obtaining the obstacle zone by target in consideration of the margin and displaying the obstacle zone by target on the display screen, it is possible to display the obstacle zone by target different from the obstacle zone by target obtained according to the general method.

Although the case where the obstacle zone by target OZTs and the obstacle zone by target OZTm are displayed on the display screen 100 has been described, the obstacle zone by target OZTm can be displayed without the obstacle zone by target OZTs displayed. In a case where both the obstacle zone by target OZTs and the obstacle zone by target OZTm are displayed, the obstacle zone by target OZTs and the obstacle zone by target OZTm may be displayed in different display forms. In the case of the different display forms, the line segments or end points of the obstacle zones by target may have different colors or shapes, or different shapes of figures may be used. Each obstacle zone by target may be displayed together with a character string or a symbol with which it is possible to grasp whether the obstacle zone by target is one obtained without considering the allowance or one obtained in consideration of the allowance.

Figure 3:
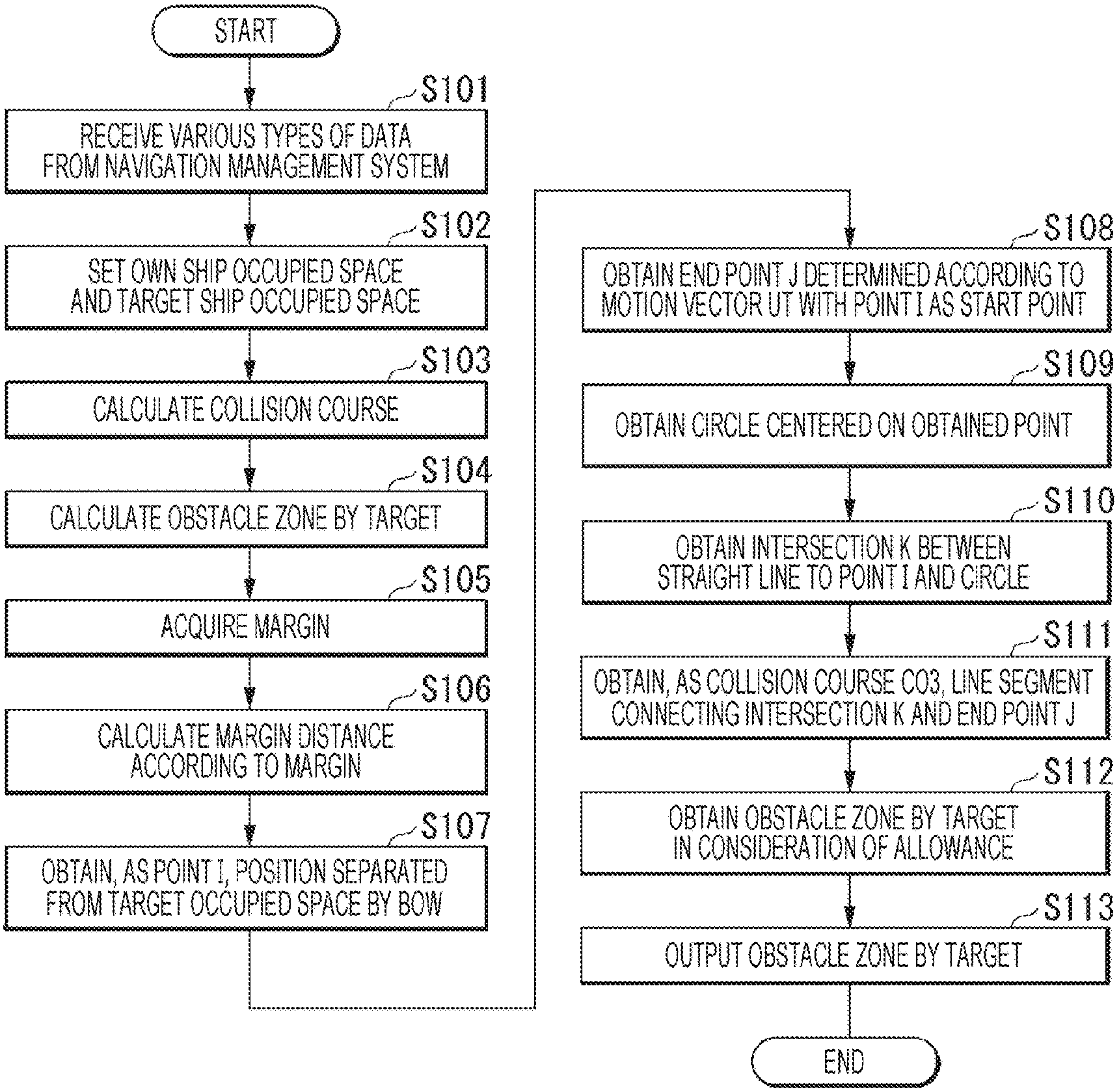
FIG. 3 is a flowchart for describing operation of the navigation assistance device 20.
Figure 4:
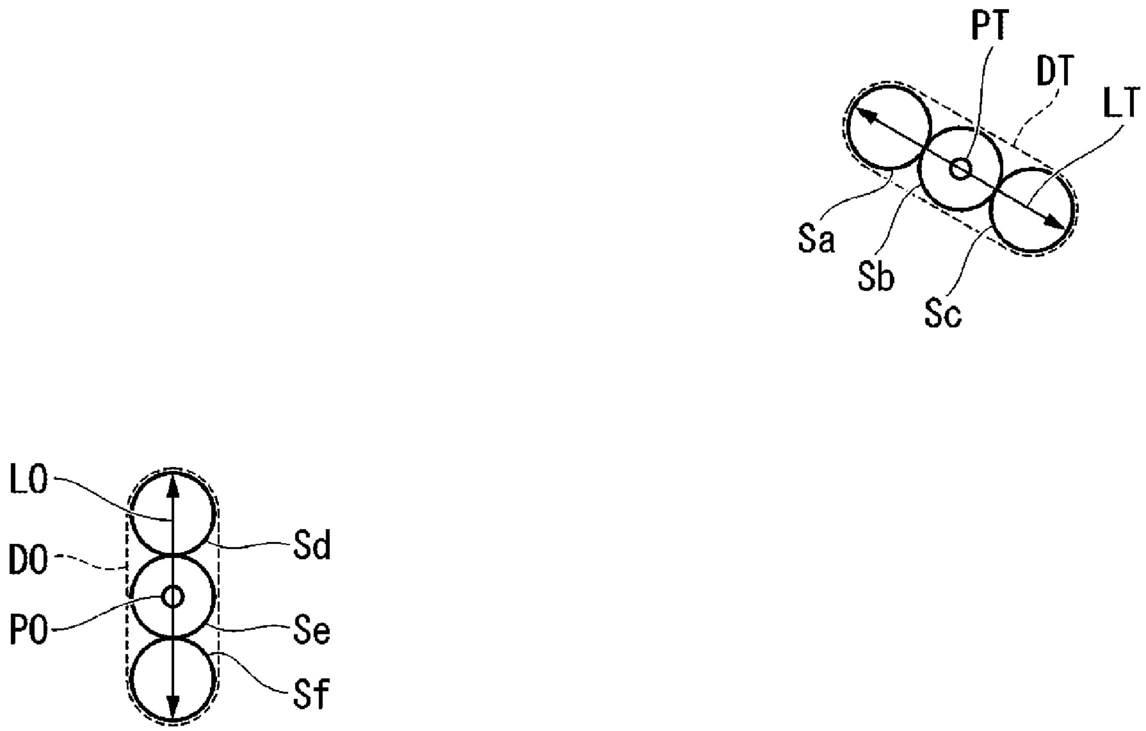
FIG. 4 is a view for describing an own ship occupied space and a target ship occupied space.

Next, operation of the above-described navigation assistance device 20 will be described. FIG. 3 is a flowchart for describing operation of the navigation assistance device 20. FIG. 4 is a view for describing an own ship occupied space and a target ship occupied space.

The input unit 210 of the navigation assistance device 20 acquires various types of data from the navigation management system 10 (Step S101). The data acquired here includes, for example, the speed of an own ship PO, the speed of the target ship (target ship PT), the position of the own ship PO, the position of the target ship PT, the course of the own ship PO, the course of the target ship PT, and the safe passing distance.

The collision calculation unit 231 sets an own ship occupied space DO and a target ship occupied space DT based on various types of data obtained from the navigation management system 10 (Step S102).

Here, the own ship occupied space DO is a space taken as an own ship area. The target ship occupied space DT is a space taken as a target ship area. That is, a state in which two occupied spaces which are the own ship occupied space DO and the target ship occupied space DT are in contact with each other indicates a state in which the own ship and the target ship are in contact with each other.

The target ship occupied space DT includes a target ship area (circle Sb) set with reference to the position of the target ship and an adjacent area set according to the target ship area at a position adjacent to the target ship area (circle Sb) on at least one of the bow or stern side of the target ship. Here, the circle Sa is set as the adjacent area on the bow side of the circle Sb which is the target ship area, and the circle Sc is set as the adjacent area on the stern side of the circle Sb. Thus, the target ship occupied space DT is set as an area including three circles. In addition, the adjacent area (circle Sa, circle Sc) is arranged adjacent to the target ship area (circle Sb) in the direction along the course of the target ship. The radii of the circles Sa, Sb, Sc are the same as each other.

A total target ship length LT is the sum of the diameters of the three circles (circle Sa, circle Sb, circle Sc).

Similarly, the own ship occupied space DO includes an own ship area (circle Se) set with reference to the position of the own ship and an adjacent area set according to the own ship area at a position adjacent to the own ship area (circle Se) on at least one of the bow or stern side of the own ship. Here, a circle Sd is set as the adjacent area on the bow side of the circle Se which is the own ship area, and a circle Sf is set as the adjacent area on the stern side of the circle Se. Thus, the own ship occupied space DO is set as an area including three circles. In addition, the adjacent area (circle Sd, circle Sf) is arranged adjacent to the own ship area (circle Se) in the direction along the course of the own ship. The radii of the circles Sd, Se, Sf are the same as each other.

A total own ship length LO is the sum of the diameters of the three circles (circle Sd, circle Se, circle Sf).

The radius of the target ship area can be set according to the size of the hull of the target ship and the safe passing distance, and the radius of the own ship area can be set according to the size of the hull of the own ship and the safe passing distance.

A collision course CO can be obtained as an own ship course in which the own ship occupied space DO and the target ship occupied space DT come into contact with each other.

Next, the collision calculation unit 231 obtains the collision course CO (Step S103).

Figure 5:
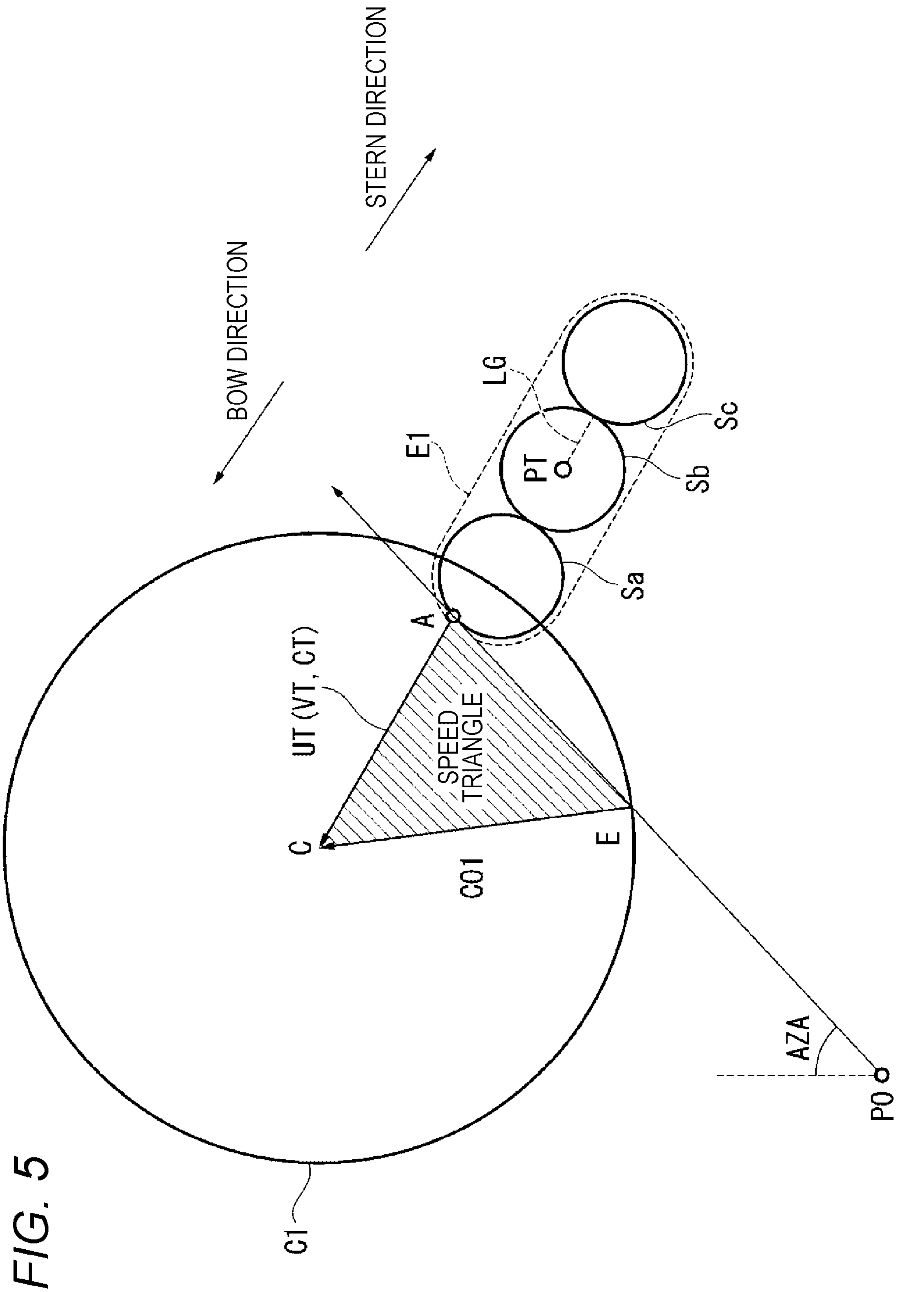
FIG. 5 is a view for describing part of a calculation process of obtaining a collision course CO.
Figure 6:
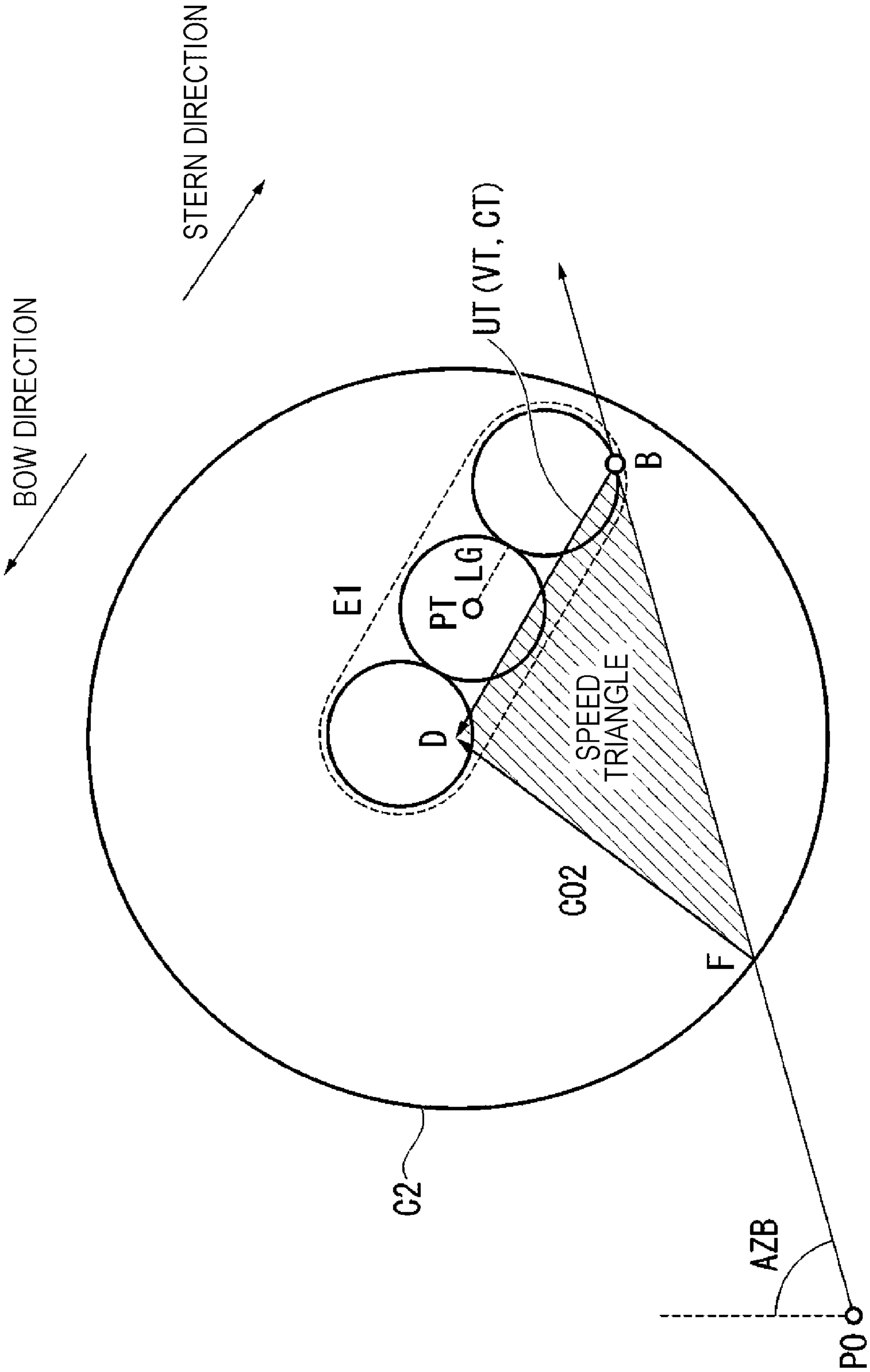
FIG. 6 is a view for describing part of the calculation process of obtaining the collision course CO.

FIGS. 5 and 6 are views for describing part of a calculation process of obtaining the collision course CO.

In this step, the collision calculation unit 231 first obtains the target occupied space E1.

The target occupied space E1 is an area in which three circles (here, circle Sa, circle Sb, and circle Sc) centered on a target ship position PT and having a target occupancy distance LG are aligned with the target ship course and which surrounds these three circles so as to circumscribe the three circles.

The target occupied space E1 is similar to the target ship occupied space DT described above, but the target occupancy distance LG (radius of the circle Sb in the target ship occupied space DT) is set to be equal to or greater than ⅓ of the sum of the half of the total own ship length LO and the half of the total target ship length LT. The target occupancy distance LG can be expressed by Formula (1) below.

$$LG \geqq ((LO/2)+(LT/2))/3 \quad (1)$$

By setting the target occupancy distance LG in this manner, the area of the own ship occupied space DO can be set to be included in the target occupied space E1, and the own ship PO can be taken as a point.

Next, the collision calculation unit 231 obtains, from an own ship position PO, a tangent POA to the target occupied space E1 at a contact A (FIG. 5) and a tangent POB to the target occupied space E1 at a contact B (FIG. 6). The tangent POA indicates the direction of the minimum tangent to the target occupied space E1 from the position of the own ship PO, and the tangent POB indicates the direction of the maximum tangent to the target occupied space E1 from the position of the own ship PO. Note that the contact A is arranged in the course direction (bow side) of the target ship PT, and the contact B is arranged on the opposite side (stern side) to the course of the target ship PT.

Next, the collision calculation unit 231 obtains an end point C determined by drawing a motion vector UT of the target ship with the contact A as a start point (FIG. 5), and obtains an end point D determined by drawing a motion vector UT of the target ship with the contact B as a start point (FIG. 6). Here, the motion vector UT of the target ship is a vector with a magnitude as a target ship speed VT and a direction as a target ship course CT.

Next, the collision calculation unit 231 obtains a circle C1 centered on the end point C and having an own ship speed VO as a radius, and obtains an intersection between the circle C1 and the tangent POA as an intersection E (FIG. 5).

Next, the collision calculation unit 231 obtains a circle C2 centered on the end point D and having the own ship speed VO as a radius, and obtains an intersection between the circle C2 and the tangent POB as F (FIG. 6).

Next, the collision calculation unit 231 obtains the collision course in which the own ship PO collides with the target ship PT. Here, the collision calculation unit 231 obtains the direction of a line segment EC connecting the intersection E and the end point C as a collision course CO1, and obtains the direction of a line segment FD connecting the intersection F and the end point D as a collision course CO2.

Here, the collision course CO can be obtained based on Formula (2) below.

[Mathematical Formula 1]

$$CO = (AZA\ or\ AZB) - \sin^{-1}\left\{\frac{VT}{VO}\sin[(AZA\ or\ AZB) - CT]\right\} \quad (2)$$

Formula (2) is expressed including $\sin^{-1}$. Since two solutions are obtained for $\sin^{-1}$, two collision courses are obtained for one tangent. That is, since there are two tangents which are the minimum tangent POA and the maximum tangent POB in total and two solutions are obtained for each tangent by $\sin^{-1}$, four collision courses are obtained in total.

Based on the obtained four collision courses and a predetermined conditional expression based on time to closest point of approach (TCPA), the number of collision courses is any one of 0, 2, and 4.

In a case where there are no collision courses, the obstacle zone by target is not plotted. In a case where there are two collision courses, one obstacle zone by target is obtained. In a case where there are four collision courses, two obstacle zones by target are obtained. Here, a case where there are two collision courses (collision course CO1, collision course CO2) and one obstacle zone by target is obtained will be described.

Figure 7:
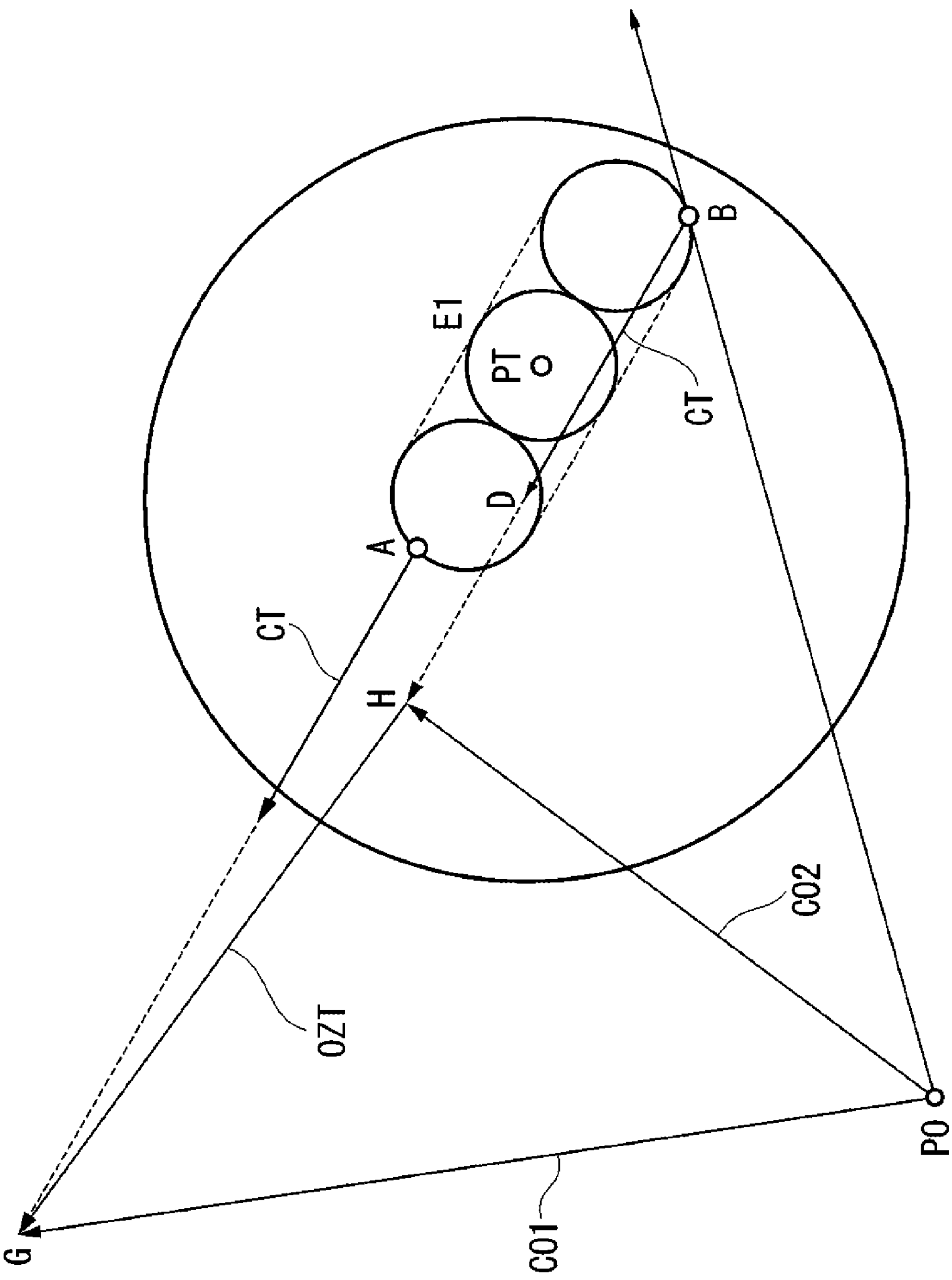
FIG. 7 is a view for describing a process of obtaining the obstacle zone by target.

When the collision courses are obtained, the collision calculation unit 231 obtains the obstacle zone by target (Step S104). Here, FIG. 7 is a view for describing a process of obtaining the obstacle zone by target. As illustrated in this figure, the collision calculation unit 231 obtains a straight line in the direction of the collision course CO1 with the own ship position PO as a base point, obtains a straight line in the direction of the target ship course CT with the contact A as a base point, and obtains an intersection between these two straight lines as an intersection G. The collision calculation unit 231 obtains a straight line in the direction of the collision course CO2 with the own ship position PO as a base point, obtains a straight line in the direction of the target ship course CT with the contact B as a base point, and obtains an intersection between these two straight lines as an intersection H.

The collision calculation unit 231 obtains a straight line connecting the obtained intersection G and intersection H as an obstacle zone by target. When the own ship PO sails in this obstacle zone by target, the own ship PO passes through the target occupied space E1 and collides with the target ship PT.

Here, the obstacle zone by target obtained based on Steps S103, S104 described above is a generally-obtained obstacle zone by target.

Next, the processing for obtaining the obstacle zone by target in consideration of the allowance will be described. In this case, a method for performing the collision calculation has part common to Steps S103 to S104 described above. Description of such common part will be omitted, and differences will be mainly described. In addition, in a case of obtaining the obstacle zone by target in consideration of the allowance, at least one of a case of obtaining a collision course with a desired passing distance on the bow side of the target ship PT and obtaining an obstacle zone by target from such a result or a case of obtaining a collision course with a desired passing distance on the stern side of the target ship PT and obtaining an obstacle zone by target from such a result may be employed. Here, the case will be described, in which the collision course with the desired passing distance on the bow side of the target ship PT is obtained and the obstacle zone by target is obtained from the result.

The input unit 210 acquires the margin (Step S105). Here, for example, the margin is acquired based on the contents of operation on the operator. For example, when a certain margin is set by turning the operator such as a dial, the input unit 210 acquires the set margin.

When the margin is acquired via the input unit 210, the collision calculation unit 231 obtains a distance corresponding to the margin as a margin distance (Step S106). For example, in a case where a certain margin is designated, the margin distance is calculated as 1 mile. Note that in a case where the contents of operation of lowering the margin are input, the collision calculation unit 231 decreases the margin distance set as the allowance, such as 0.8 miles or 0.6 miles, according to the operation contents, and in a case where the contents of operation of raising the margin are input, increases the margin distance set as the allowance, such as 1.2 miles or 1.4 miles, according to the operation contents.

Figure 8:
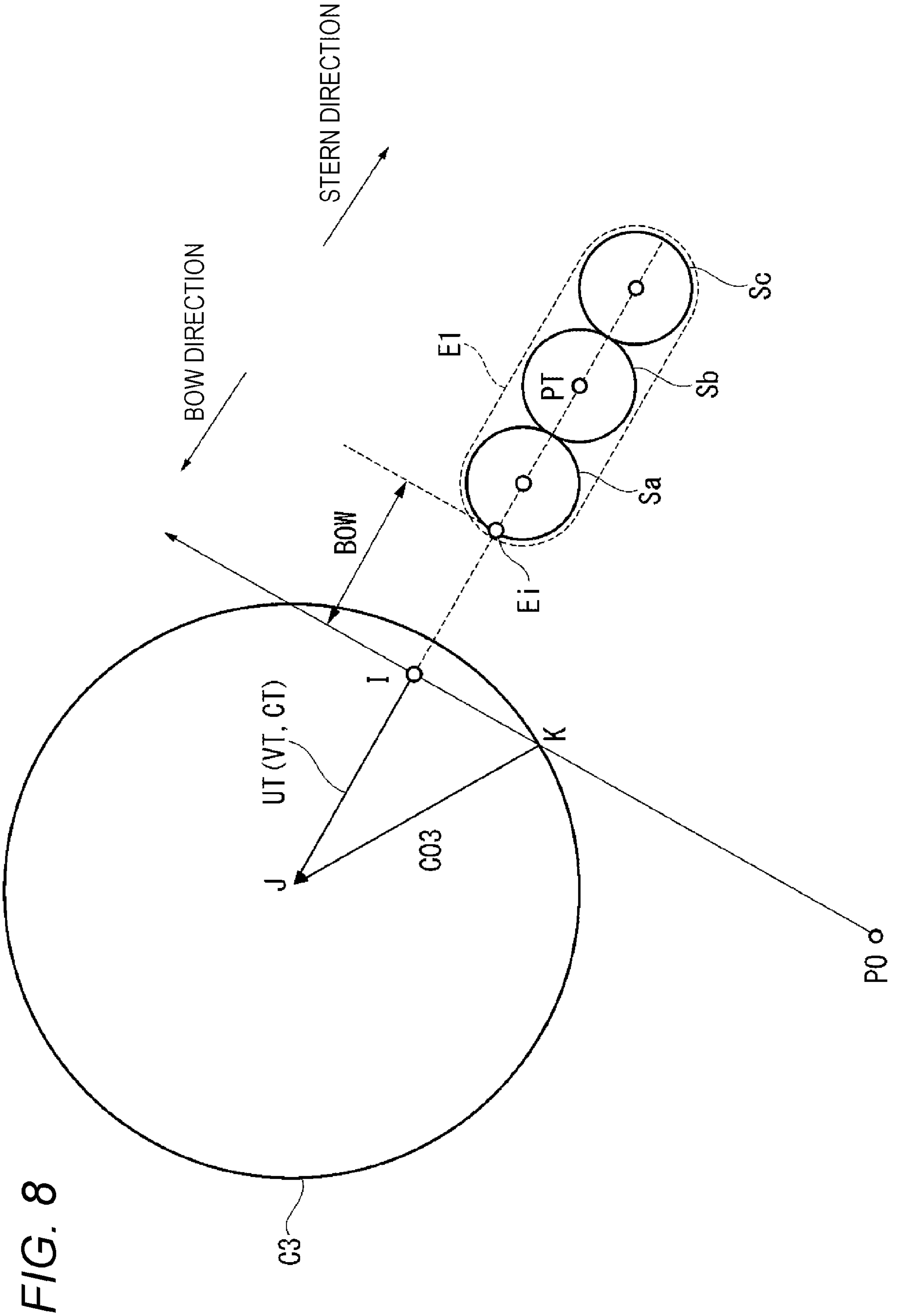
FIG. 8 is a view for describing processing for obtaining the obstacle zone by target in consideration of an allowance.
Figure 9:
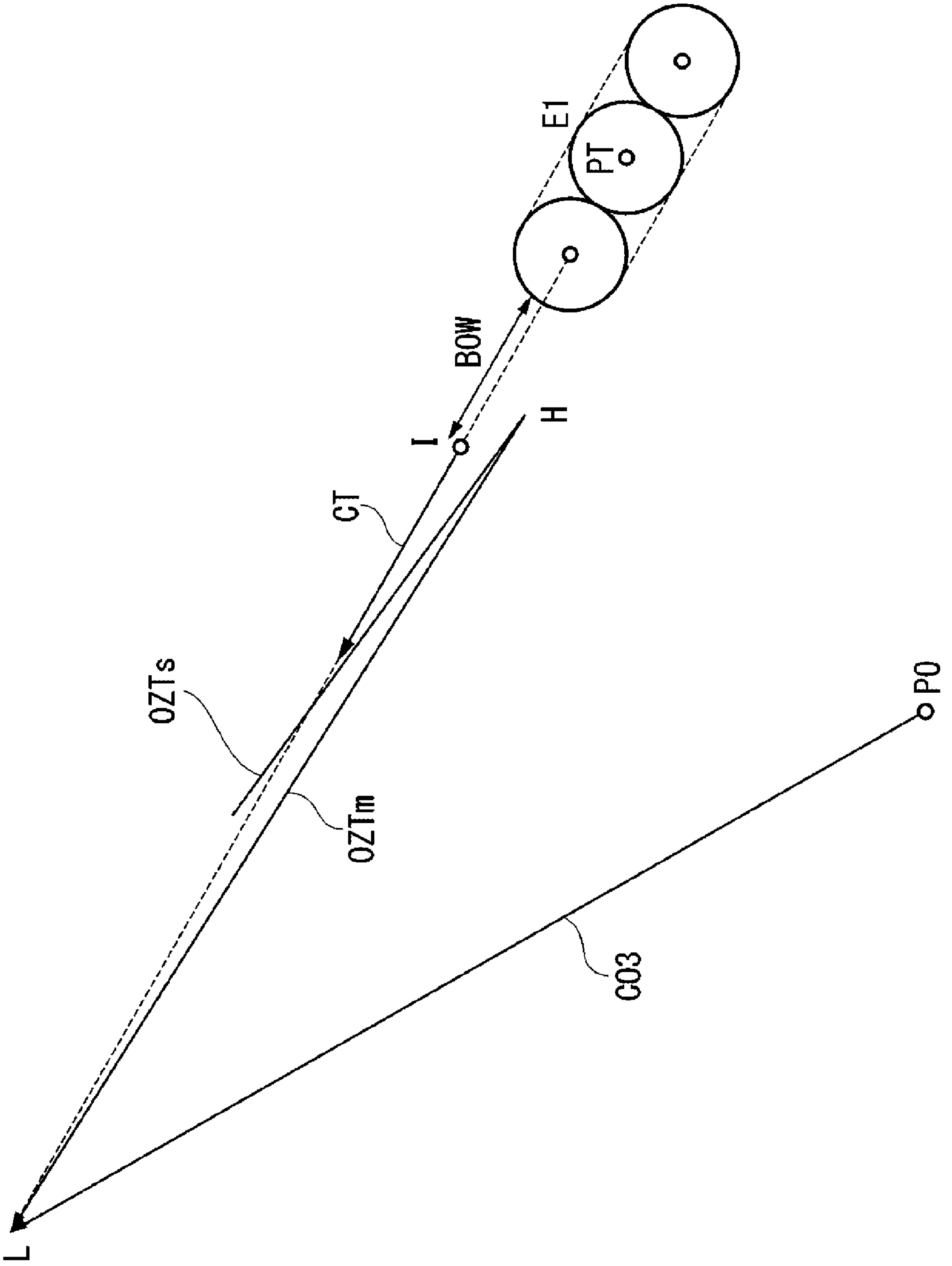
FIG. 9 is a view for describing the processing for obtaining the obstacle zone by target in consideration of the allowance.

FIGS. 8 and 9 are views for describing the processing for obtaining the obstacle zone by target in consideration of the allowance.

The collision calculation unit 231 obtains a point Ei on the circle Sa of the target occupied space E1, which is on a straight line passing through the center of the circle Sa and the target ship PT and on the outer peripheral side of the target occupied space E1. Then, the collision calculation unit 231 obtains a position separated from the point Ei as a base point by BOW in the course direction (bow side) of the target ship PT as a point I (Step S107). Here, the BOW indicates a desired passing distance (margin distance).

Next, the collision calculation unit 231 obtains an end point J determined by drawing the motion vector UT of the target ship with the point I as a start point (Step S108), and obtains a circle C3 centered on the end point J and having the own ship speed VO as a radius (Step S109).

The collision calculation unit 231 obtains a straight line POI from the own ship PO to the point I, and obtains an intersection between the circle C3 and the straight line POI as K (Step S110).

Then, the collision calculation unit 231 obtains the direction of a line segment KJ connecting the intersection K and the end point J as a collision course CO3 which is a collision course in which the own ship PO avoids collision with a passing distance of BOW in the bow direction of the target ship PT (Step S111).

Next, the collision calculation unit 231 obtains the obstacle zone by target in consideration of the allowance (Step S112). FIG. 9 is a view for describing a process of obtaining the obstacle zone by target in consideration of the allowance.

The collision calculation unit 231 obtains a straight line in the direction of the collision course CO3 with the own ship position PO as a base point, obtains a straight line in the direction of the target ship course CT with the point I as a base point, and obtains an intersection between these two straight lines as an intersection L.

The collision calculation unit 231 calculates the obstacle zone by target OZTm with a desired passing distance (allowance) on the bow side by obtaining a straight line connecting the intersection H and the intersection L.

Here, one end of the obstacle zone by target OZTs obtained without considering the allowance and one end of the obstacle zone by target OZTm overlap with each other at the intersection H. However, the other end of the obstacle zone by target OZTs and the other end of the obstacle zone by target OZTm are at different positions.

When the obstacle zone by target is obtained, the collision calculation unit 231 outputs the obstacle zone by target via the output unit 220, and displays the obstacle zone by target on the screen (Step S113).

The above-described processing may be repeatedly executed at certain time intervals (e.g., in every second) to update and display the obstacle zone by target on the display screen. The above-described processing may be executed at timing when the margin input via the input unit 210 is changed.

In the above-described processing, the case where the obstacle zone by target OZTs is obtained by executing Steps S103, S104 has been described. However, the obstacle zone by target OZTm may be obtained without executing Steps S103, S104.

In the above-described embodiment, the case where the collision calculation is performed for one target ship PT has been described. However, in a case where there is a plurality of target ships, the collision calculation may be performed for each target ship according to a similar procedure.

In a case where there is the plurality of target ships and obstacle zones by target are displayed with a certain margin, each obstacle zone by target is displayed with a longer line segment than usual because there is the plurality of obstacle zones by target and the margin is taken into consideration. In this case, it may be difficult to take a course for avoiding the obstacle zone by target. In such a case, by operating the operator so as to decrease the margin, the length of the line segment of each obstacle zone by target is shortened in response to the decrease in the margin, so that it is possible to easily take the course for avoiding the obstacle zone by target.

In the embodiment described above, the case where the obstacle zone by target is obtained with a desired passing distance on the bow side of the target ship PT has been described. Next, a case where the obstacle zone by target is obtained with a desired passing distance on the stern side of the target ship PT will be described.

Figure 10:
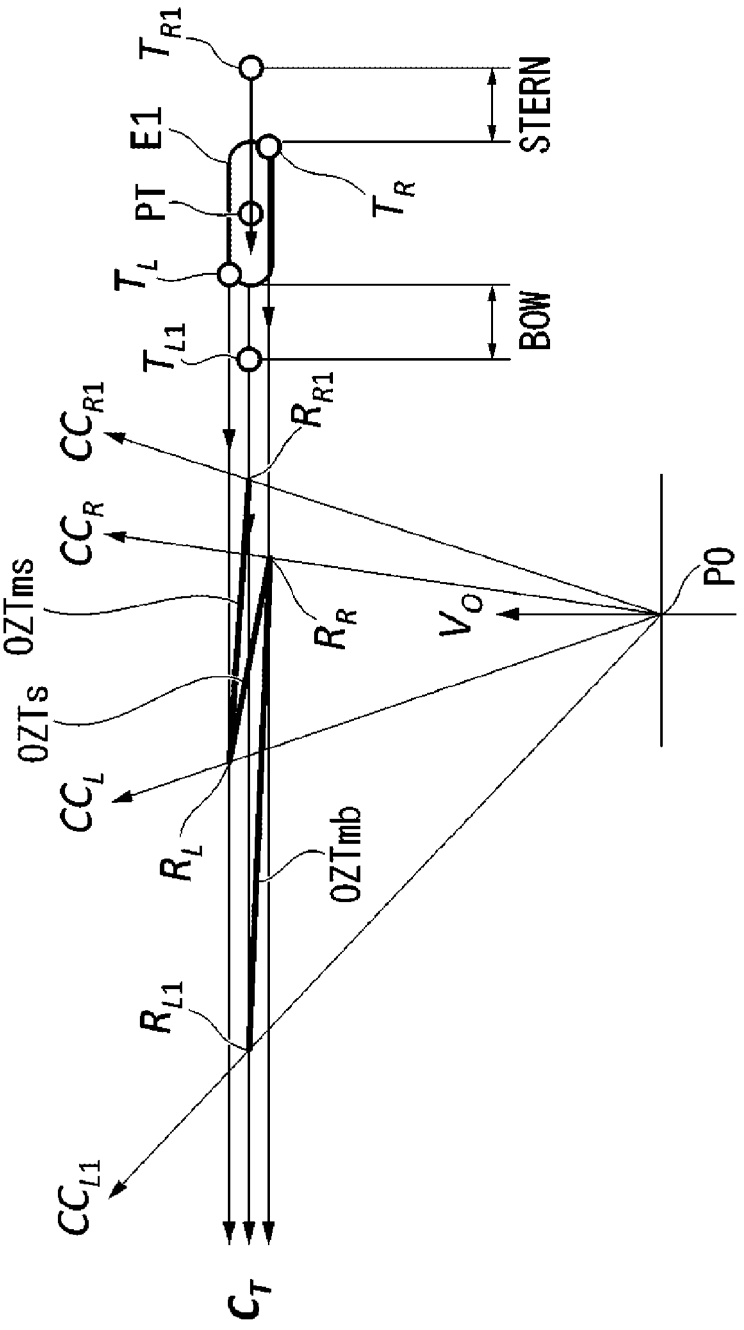
FIG. 10 is a view for describing a display screen on which an obstacle zone by target with a desired passing distance on a bow side and an obstacle zone by target with a desired passing distance on a stern side are displayed.

FIG. 10 is a view for describing a display screen in a case where an obstacle zone by target with a desired passing distance on the bow side of the target ship PT and an obstacle zone by target with a desired passing distance on the stern side of the target ship PT are displayed.

This figure illustrates a case where the target ship PT sails from the right side to the left side with respect to the own ship PO.

The collision calculation unit 231 sets the target occupied space E1 for the target ship PT according to a procedure similar to that of the collision calculation described above, and obtains the general obstacle zone by target OZTs without considering the allowance.

In addition, the collision calculation unit 231 obtains, as a point $T_{L1}$, a position separated from the target ship PT by BOW (desired passing distance) in the course direction (bow side) of the target ship PT with a bow-side point on the target occupied space E1 as a base point. Then, the collision calculation unit 231 obtains an intersection $R_{L1}$ between a collision course $CC_{L1}$ obtained from the point $T_{L1}$ and the target ship course CT line from the point $T_{L1}$. In addition, the collision calculation unit 231 obtains a point $T_R$ contacting the stern side of the target occupied space E1 from the own ship PO, and obtains a line segment connecting one end point $R_R$ of the obstacle zone by target OZTs obtained from the point $T_R$ and the intersection $R_{L1}$ as an obstacle zone by target OZTmb with a desired passing distance on the bow side of the target ship PT.

In addition, the collision calculation unit 231 obtains, as a point $T_{R1}$, a position separated from the target ship PT by STERN (desired passing distance) on the opposite side (stern side) to the course direction of the target ship PT with a stern-side point on the target occupied space E1 as a base point. Then, the collision calculation unit 231 obtains an intersection $R_{R1}$ between a collision course $CC_{R1}$ obtained from the point $T_{R1}$ and the target ship course CT line from the point $T_{R1}$. In addition, the collision calculation unit 231 obtains a point $T_L$ contacting the bow side of the target occupied space E1 from the own ship PO, and obtains a line segment connecting the other end point $R_L$ of the obstacle zone by target OZTs obtained from the point $T_L$ and the intersection $R_{R1}$ as an obstacle zone by target OZTms with a desired passing distance on the stern side of the target ship PT.

In this manner, the obstacle zone by target with the desired passing distance on the stern side is obtained so that the obstacle zone by target can be displayed on the display screen.

Here, the case has been described, in which the three obstacle zones by target which are the obstacle zone by target OZTs generally obtained, the obstacle zone by target OZTmb with the desired passing distance on the bow side, and the obstacle zone by target OZTms with the desired passing distance on the stern side are displayed on the display screen. However, any one of the obstacle zones by target may be selected and displayed. The obstacle zone by target OZTs, the obstacle zone by target OZTmb, and the obstacle zone by target OZTms may be displayed in different display forms.

The obstacle zone by target OZTmb and the obstacle zone by target OZTms may be obtained using the same margin, or may be obtained using different margins. Generally, it is preferable to pay more attention to the bow side of the target ship than to the stern side of the target ship. For this reason, the margin for the bow side may be greater than that for the stern side.

According to the above-described embodiment, the obstacle zone by target is obtained in consideration of the allowance after having obtained the point separated from the target occupied space E1 of the target ship PT by the desired passing distance. However, instead of obtaining the point, a change may be made such as increasing an interval (interval between the circle Sb indicating the target ship area and the adjacent area) between the circles included in the target occupied space E1.

Note that even if the line segment of the obstacle zone by target obtained based on the general method is simply extended, the extended portion is provided without considering a positional relationship between the target ship and the own ship and the courses and speeds of the target ship and the own ship. Thus, accurate contents cannot be displayed as the obstacle zone by target.

In the present embodiment, the margin is acquired, and the collision calculation is performed after the desired passing distance has been set from the target ship occupied space according to the margin. Thus, it is possible to display the obstacle zone by target in consideration of the degree of allowance (passing distance according to a desired degree of allowance). Thus, for example, in a case where an allowance of 1 mile is designated and input via the input unit 210, even if the ship passes by the vicinity of the end portion of the obstacle zone by target displayed on the screen, the ship can sail in the course with a margin of 1 mile. Further, in this case, it is possible to take the course by recognizing that the passing distance with the allowance is 1 mile.

The navigation assistance device 20 in the above-described embodiment may be implemented by a computer. In this case, a program for implementing these functions may be recorded in a computer-readable recording medium, and the program recorded in the recording medium may be read and executed by a computer system to implement the functions. Note that the "computer system" here includes hardware such as an OS and a peripheral device. Further, the "computer-readable recording medium" refers to a portable medium such as a flexible disk, a magneto-optical disk, a ROM, or a CDROM or a storage device such as a hard disk built in a computer system. In addition, the "computer-readable recording medium" may include one dynamically holding a program for short time, such as a communication line in a case where a program is transmitted via a network such as the Internet or a communication line such as a telephone line, and one holding a program for a certain period of time, such as a volatile memory inside a computer system serving as a server or a client in this case. Moreover, the program may be for implementing some of the functions described above, may be capable of implementing the functions described above in combination with a program already recorded in a computer system, or may be implemented using a programmable logic device such as a field programmable gate array (FPGA).

Although the embodiment of the present invention has been described above in detail with reference to the drawings, the specific configuration is not limited to the embodiment and the present invention includes, e.g., design without departing from the gist of the present invention.

LIST OF REFERENCE SIGNS

PO Own Ship
PT Target Ship
10 Navigation Management System
20 Navigation Assistance Device
210 Input Unit
220 Output Unit
230 Arithmetic Unit
231 Collision Calculation Unit
240 Storage Unit

The invention claimed is:

1. A navigation assistance device for obtaining an obstacle zone by target from a relationship between an own ship and a target ship, comprising:

a margin acquisition unit that acquires a margin indicating a passing distance set as an allowance by a degree; and an arithmetic unit that calculates the obstacle zone by target; and an output unit, wherein the arithmetic unit calculates at least one of a first obstacle zone by target or a second obstacle zone by target as the obstacle zone by target, the output unit outputs at least one of the first obstacle zone by target or the second obstacle zone by target as the obstacle zone by target, in a case of calculating the first obstacle zone by target, the arithmetic unit:

obtains a first margin position which is a position separated from a bow position of the target ship in a target occupied space set with reference to a position of the target ship by a distance determined according to the margin in a direction of a target ship course;

obtains a first bow side collision course based on a position determined according to a motion vector of the target ship with reference to the first margin position, obtains a first intersection point which is an intersection point between the first bow side collision course and a straight line in the direction of the target ship course with the first margin position as a base point;

obtains a first stern side collision course based on a position determined according to the motion vector with reference to a stern contact point on a tangent line from a position of the own ship to a stern side of the target occupied space, obtains a second intersection point which is an intersection point between the first stern side collision course and a straight line in the direction of the target ship course with the stern contact point as a base point; and calculates a line segment connecting the first intersection point and the second intersection point as the first obstacle zone by target, and in a case of calculating the second obstacle zone by target, the arithmetic unit:

obtains a second margin position which is a position separated from a stern position of the target ship in the target occupied space set with reference to a position of the target ship by a distance determined according to the margin in the opposite direction to the direction of the target ship course;

obtains a second stern side collision course based on a position determined according to the motion vector with reference to the second margin position, obtains a third intersection point which is an intersection point between the second stern side collision course and a straight line in the direction of the target ship course with the second margin position as a base point;

obtains a second bow side collision course based on a position determined according to the motion vector with reference to a bow contact point on a tangent line from a position of the own ship to a bow side of the target occupied space, obtains a fourth intersection point which is an intersection point between the second bow side collision course and a straight line in the direction of the target ship course with the bow contact point as a base point; and calculates a line segment connecting the third intersection point and the fourth intersection point as the second obstacle zone by target.

2. The navigation assistance device according to claim 1, wherein the margin acquisition unit acquires the margin according to a content of operation on an operator.

3. The navigation assistance device according to claim 1, wherein the margin acquisition unit acquires the margin according to an angle of the target ship with respect to the own ship, which is determined based on the position of the own ship and the position of the target ship.

4. The navigation assistance device according to claim 1, wherein the target occupied space includes a target ship area set with reference to the position of the target ship, and an adjacent area set at a position adjacent to the target ship area on at least one of a bow or a stern side of the target ship according to the target ship area.

5. The navigation assistance device according to claim 1, wherein the margin acquisition unit acquires a changed margin in response to a change in the margin, and the arithmetic unit obtains the first margin position and the second margin position corresponding to the changed margin, and calculates the first obstacle zone by target and the second obstacle zone by target based on the first margin position and the second margin position corresponding to the changed margin.

6. A navigation assistance method executed by a computer for obtaining an obstacle zone by target from a relationship between an own ship and a target ship, comprising:

acquiring a margin indicating a passing distance set as an allowance by a degree;

calculating at least one of a first obstacle zone by target or a second obstacle zone by target as the obstacle zone by target; and outputting at least one of the first obstacle zone by target or the second obstacle zone by target, wherein in a case of calculating the first obstacle zone by target, the method comprises:

obtaining a first margin position which is a position separated from a bow position of the target ship in a target occupied space set with reference to a position of the target ship by a distance determined according to the margin in a direction of a target ship course;

obtaining a first bow side collision course based on a position determined according to a motion vector of the target ship with reference to the first margin position, obtaining a first intersection point which is an intersection point between the first bow side collision course and a straight line in the direction of the target ship course with the first margin position as a base point;

obtaining a first stern side collision course based on a position determined according to the motion vector with reference to a stern contact point on a tangent line from a position of the own ship to a stern side of the target occupied space, obtaining a second intersection point which is an intersection point between the first stern side collision course and a straight line in the direction of the target ship course with the stern contact point as a base point; and calculating a line segment connecting the first intersection point and the second intersection point as the first obstacle zone by target, and in a case of calculating the second obstacle zone by target, the method comprises:

obtaining a second margin position which is a position separated from a stern position of the target ship in the target occupied space set with reference to a position of the target ship by a distance determined according to the margin in the opposite direction to the direction of the target ship course;

obtaining a second stern side collision course based on a position determined according to the motion vector with reference to the second margin position, obtaining a third intersection point which is an intersection point between the second stern side collision course and a straight line in the direction of the target ship course with the second margin position as a base point;

obtaining a second bow side collision course based on a position determined according to the motion vector with reference to a bow contact point on a tangent line from a position of the own ship to a bow side of the target occupied space, obtaining a fourth intersection point which is an intersection point between the second bow side collision course and a straight line in the direction of the target ship course with the bow contact point as a base point; and calculating a line segment connecting the third intersection point and the fourth intersection point as the second obstacle zone by target.

7. A non-transitory computer-readable medium storing a program causing a computer to acquire a margin indicating a passing distance set as an allowance by a degree;

calculate at least one of a first obstacle zone by target or a second obstacle zone by target as the obstacle zone by target; and output at least one of the first obstacle zone by target or the second obstacle zone by target, wherein in a case of calculating the first obstacle zone by target, the program causes the computer to:

obtain a first margin position which is a position separated from a bow position a target ship in a target occupied space set with reference to a position of the target ship by a distance determined according to the margin in a direction of a target ship course;

obtain a first bow side collision course based on a position determined according to a motion vector of the target ship with reference to the first margin position, obtain a first intersection point which is an intersection point between the first bow side collision course and a straight line in the direction of the target ship course with the first margin position as a base point;

obtain a first stern side collision course based on a position determined according to the motion vector with reference to a stern contact point on a tangent line from a position of the own ship to a stern side of the target occupied space, obtain a second intersection point which is an intersection point between the first stern side collision course and a straight line in the direction of the target ship course with the stern contact point as a base point; and calculate a line segment connecting the first intersection point and the second intersection point as the first obstacle zone by target, and in a case of calculating the second obstacle zone by target, the program causes the computer to:

obtain a second margin position which is a position separated from a stern position of the target ship in the target occupied space set with reference to a position of the target ship by a distance determined according to the margin in the opposite direction to the direction of the target ship course;

obtain a second stern side collision course based on a position determined according to the motion vector with reference to the second margin position, obtain a third intersection point which is an intersection point between the second stern side collision course and a straight line in the direction of the target ship course with the second margin position as a base point;

obtain a second bow side collision course based on a position determined according to the motion vector with reference to a bow contact point on a tangent line from a position of the own ship to a bow side of the target occupied space, obtain a fourth intersection point which is an intersection point between the second bow side collision course and a straight line in the direction of the target ship course with the bow contact point as a base point; and calculate a line segment connecting the third intersection point and the fourth intersection point as the second obstacle zone by target.

8. The navigation assistance device according to claim 1, wherein the output unit outputs the at least one of the first obstacle zone by target or the second obstacle zone by target as the obstacle zone by target to a display device.

9. The navigation assistance method according to claim 6, further comprising outputting the at least one of the first obstacle zone by target or the second obstacle zone by target as the obstacle zone by target to a display device.

10. The non-transitory computer-readable medium according to claim 7, wherein the program further causes the computer to output the at least one of the first obstacle zone by target or the second obstacle zone by target as the obstacle zone by target to a display device.

* * * * *